INVENTOR
Ryohei Yamane
BY
Kurt Kelman
agent

Feb. 22, 1966 RYOHEI YAMANE 3,236,428

APPARATUS FOR REGULATING AUTOMATICALLY A RECORDING APPARATUS

Filed Sept. 10, 1963 2 Sheets-Sheet 2

INVENTOR

RYOHEI YAMANE

BY

Kurt Kelman agent

United States Patent Office 3,236,428
Patented Feb. 22, 1966

3,236,428

APPARATUS FOR REGULATING AUTOMATICALLY A RECORDING APPARATUS

Ryohei Yamane, 2–23 Tsurumaki-cho, Setagaya-ku, Tokyo, Japan

Filed Sept. 10, 1963, Ser. No. 307,992
Claims priority, application Japan, Sept. 13, 1962, 37/39,591; Sept. 15, 1962, 37/39,855; Nov. 9, 1962, 37/50,408
3 Claims. (Cl. 226—24)

This invention relates to controls for a recording apparatus, and more particularly, to a device for automatically stopping or starting the movement of the recording medium, more specifically magnetic tape.

In this invention, control information is recorded on the end of the recording tape and when the recording apparatus is to be stopped, started or otherwise controlled the control information is sensed by the reading head of the apparatus.

An object of this invention is to provide an apparatus for automatically stopping or starting the movement of the recording medium in a recording apparatus.

Another object is to provide an apparatus for modifying the path or direction of travel of the recording medium.

Another object is to provide means for placing control information on the beginning and end of the recording medium.

Another object is to provide an apparatus for sensing the control information, and thereby to regulate the movement of the recording medium.

Figure 1:
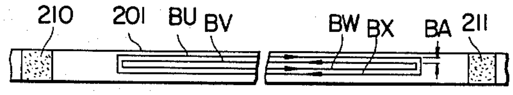
Figure 2:
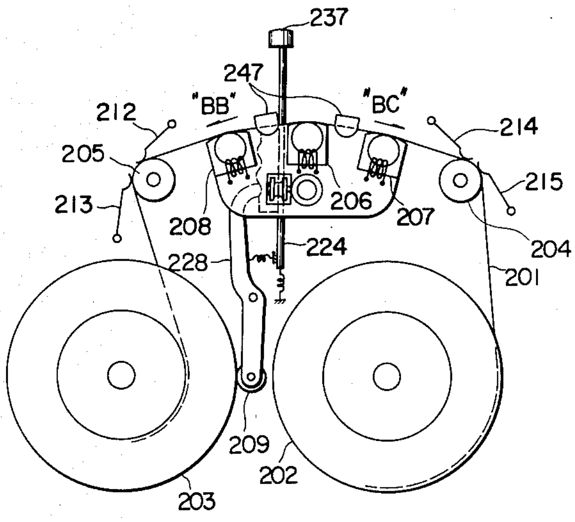
Figure 3:
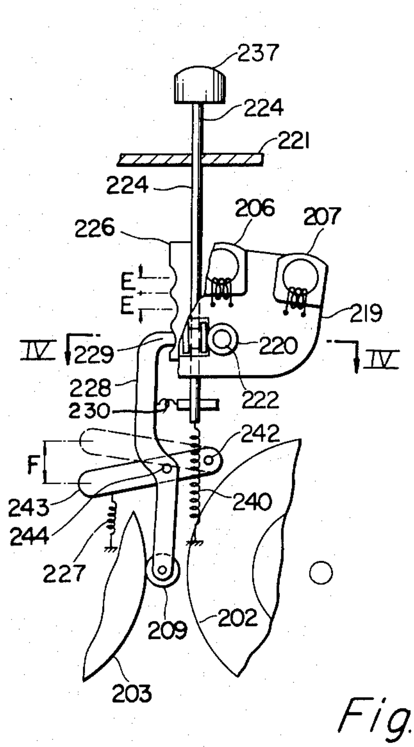
Figure 4:
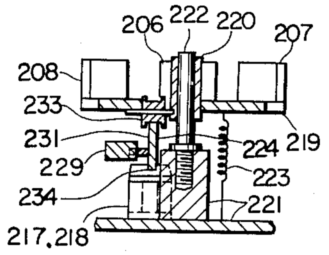
Figure 5:
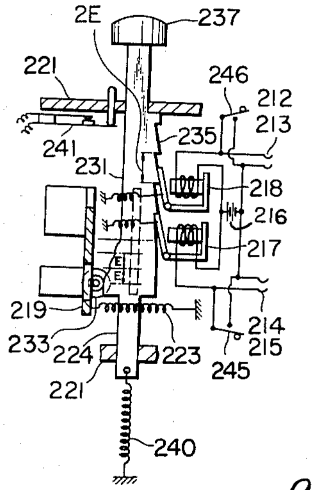

Other objects and advantages of this invention will become apparent from the following detailed description taken in connection with the accompanying drawing, in which:

FIG. 1 is a plan view of a recording medium used in the recording apparatus of this invention, FIG. 2 illustrates the operating elements of a recording apparatus of this invention in side elevation, FIG. 3 shows an enlarged detail of the recording apparatus shown in FIG. 2, FIG. 4 shows the apparatus of FIG. 3 in section on the line IV—IV, and FIG. 5 shows the detail of FIG. 3 in side elevation.

As shown in FIG. 1, conductive films 210 and 211 are provided at the beginning and at the end of a magnetic film 201. When the magnetic tape 201 is fed from the right to the left and a recording is made on a track BU, the conductive film 211 on the magnetic tape is sensed at the end of the recording and the magnetic tape is then raised by a distance BA by means of a mechanism which will be described later in detail, and a new recording is made on the track BV. At the end of the recording the conductive tape 210 on the magnetic film is sensed, and, the magnetic tape is again raised the same distance BA. A new track BW is recorded next. At last, at the end of a fourth recorded track BX, the magnetic tape is lowered by a distance of three times BA, and a new recording is made on the track BU or the record on the track BU is reproduced.

A mechanism for raising or lowering the magnetic tape is shown in FIGS. 2 to 5. A magnetic tape 201 is wound from a reel 202 to a reel 203 driven by a roller 209 in a conventional manner. The roller is mounted at one end of a lever 228. The tape travels over a guide roller 204, an erasing head 207, a recording head 206, an erasing head 208 and a guide roller 205 in the direction shown by the arrow "BB." The magnetic tape travels from the reel 203 to the reel 202 in the direction of the arrow "BC" when the driving roller 209 engages the reel

202 upon movement of the lever 228 as will presently become apparent. The erasing head 207 and recording head 206 operate, and the erasing head 208 does not operate during tape travel in the direction BB, and erasing head 208 and recording head 206 operate, and the erasing head 207 does not operate while the tape travels in the direction BC. When the conductive films 210, 211 pass the guide rollers 204 and 205, they conductively connect respective pairs of conductive brushes 212, 213 and 214, 215 which are connected to relays 217 and 218 through a battery 216 as shown in FIG. 5.

As seen in FIG. 4, a chassis 219 which carries the recording head 206 and the erasing heads 207 and 208 is provided with a sleeve 220 which slidably engages a shaft 222 fixed on the base plate 221 of the recorder. The chassis 219 is urged toward the base plate 221 by means of a spring 223.

As best seen in FIGS. 3 and 4, alternating projections and recesses are provided on one cam face 226 of a control rod 224, the center-to-center distance between adjacent projections and recesses being E. A cam follower 229 at the end of the lever 228 is urged toward one of the recesses by a spring 230, said lever 228 being pivoted on a pin 244. In the position of the mechanism shown in FIG. 3, the roller 209 touches the reel 203, and the magnetic tape 201 travels in the direction shown by the arrow "BB." When the control rod 224 is shifted from the position shown in FIG. 3 by the distance E, the cam follower 229 engages a projection, and the roller 209 touches the other reel 202, whereby magnetic tape 201 travels in the other direction shown by the arrow "BC."

As shown in FIG. 5, a stepped cam face is provided on the other face 231 of the control rod 224, the steps being spaced by a distance E. A roller 233 engages the stepped cam face. The shaft of roller 233 is held between the chassic 219 and the sleeve 220, and therefore when the control rod 224 is shifted in the direction shown by arrow D by the distance E, the chassis 219 is lowered be the height of a step by means of a spring 223. In other words, the movement of the control rod 224 causes the chassis 219 carrying the recording head 206 and the erasing heads 207 and 208 to move up and down by the height of the cam steps.

Three clicks 235 are also provided on the control rod 224 opposite the stepped cam face, and are spaced by a distance 2E. The clicks 235 engage the armature of one of two relays 217 and 218. The control rod 224 is, therefore, lowered by the alternative energizing of the two relays.

The apparatus shown in FIGS. 1 to 5 is operated as follows: Assuming that the magnetic tape 201 initially travels in the direction of the arrow "BB" and the recording head 206 is on the track BU. When the conductive film 210 at the end of the tape 201 touches the brushes 214 and 215, the relay 217 is energized and its armature is disengaged from the click 235 so that the control rod 224 is shifted a distance E by a spring 240 until the armature of the relay 218 engages the click 235. The cam follower 229 reaches a projection of the control rod 220 and the roller 209 touches the reel 203 to reverse the direction of travel of the magnetic tape 201. The chassis 219 with the recording head 206 and the erasing heads 207 and 208 is lowered simultaneously a distance E so that the recording head 206 is on the track BV.

When the conductive film 210 touches the conductive brushes 212 and 213 the relay 218 is energized and its armature is disengaged from the click 235 so that the control rod 224 shifts another distance E until the armature of the relay 217 engages a click 235. The cam follower 229 drops into a recess of the control rod 224 and the roller 209 touches the reel 202 to cause the type to travel in the direction of the arrow "BB" while the chassis 219 is further lowered a distance E so that the recording head 206 is on the track BW.

The erasing heads 207 and 208 are switched on and off alternatively in accordance with the direction of travel of the magnetic tape 201.

When the armature of one of the relays is disengaged from the last click 235, the knob 237 provided at the end of the control rod 224 actuates a limit switch 241 and interrupts the electrical current supply to the apparatus.

If the tape is to be rewound a short distance a lever 243 pivoted on a pin 242 and carrying the pin 244 is rotated clockwise a distance F so that the pin 244 is shifted upward by a distance E. The direction of travel of the magnetic film is thereby reversed.

What is claimed is:

1. In a recording apparatus, in combination:

(a) a base member;

(b) a chassis member mounted on said base member for movement in a predetermined direction;

(c) reel means for moving a multiple-track elongated magnetic recording carrier in a fixed path relative to said base member, the tracks of said carrier being juxtaposed transversely of the direction of elongation thereof;

(d) head means mounted on said chassis member adjacent said path for interaction with the tracks of said recording carrier, said carrier being moved past said head means by said reel means in a direction transverse of said predetermined direction;

(e) a control member movably mounted on said base member and having a plurality of cam faces;

(f) drive means shiftable on said base member between two positions in which said drive means actuate movement of said recording carrier in said path by said reel means in respective opposite directions;

(g) first motion transmitting means engaging a first one of said cam faces and operatively connected to said drive means for shifting the same between said positions thereof in response to movement of said control member;

(h) second motion transmitting means engaging a second one of said cam faces and operatively connected to said chassis member for moving the same in response to said movement of said control member between respective positions in which said head means interact with different tracks of said carrier;

(i) sensing means adjacent said track for sensing passage of a signal element on said carrier; and (j) control actuating means responsive to the sensing of said passage by said sensing means for actuating said movement of said control member.

2. In an apparatus as set forth in claim 1, a third one of said cam faces including a plurality of aligned engaging clicks, and said control actuating means including yieldably resilient means urging said movement of said control member, and click engaging means operatively connected to said sensing means normally engaging one of said clicks and preventing said movement of said control member, and responsive to said sensed passage for disengagement from said click, whereby said control member is free to move under the urging of said resilient means.

3. In an apparatus as set forth in claim 2, said click engaging means including two relays having respective armatures alternatively engageable with said clicks during said movement of said control member, said relays being connected to said sensing means for withdrawing the armature thereof from said clicks in response to said sensed passage.

References Cited by the Examiner

UNITED STATES PATENTS

| | | | |
|---|---|---|---|
| 2,430,538 | 11/1947 | Somers | 226—50 |
| 2,668,059 | 2/1954 | Roberts | 226—51 X |
| 2,705,639 | 4/1955 | Lekas | 226—50 X |
| 2,732,144 | 1/1956 | Jones | 226—50 |
| 2,996,229 | 8/1961 | Loewe | 226—50 |
| 3,070,321 | 12/1962 | Bara | 242—55.12 |
| 3,080,455 | 3/1963 | Namenyi-katz. | |

M. HENSON WOOD, Jr., *Primary Examiner.*

A. McKEON, W. F. McCARTHY, *Assistant Examiners.*